(12) United States Patent  
Tanaka

(10) Patent No.: US 12,113,367 B2  
(45) Date of Patent: Oct. 8, 2024

(54) POWER RECEIVER

(71) Applicant: Daifuku Co., Ltd., Osaka (JP)

(72) Inventor: Jun Tanaka, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 8 days.

(21) Appl. No.: 18/210,288

(22) Filed: Jun. 15, 2023

(65) Prior Publication Data

US 2023/0412002 A1     Dec. 21, 2023

(30) Foreign Application Priority Data

Jun. 16, 2022    (JP) ................................. 2022-097273

(51) Int. Cl.  
*H02J 50/12*      (2016.01)

(52) U.S. Cl.  
CPC ........... *H02J 50/12* (2016.02); *H02J 2310/40* (2020.01)

(58) Field of Classification Search  
CPC .............................. H02J 50/12; H02J 2310/40  
See application file for complete search history.

(56) References Cited

U.S. PATENT DOCUMENTS 9,349,533 B2    5/2016   Yamamoto  
2013/0334895 A1   12/2013   Yamamoto

FOREIGN PATENT DOCUMENTS

JP           5447413 B2     3/2014

*Primary Examiner* — Robert L Deberadinis  
(74) *Attorney, Agent, or Firm* — The Webb Law Firm

(57) ABSTRACT

A power receiver includes a pickup coil, a rectifier, a chopper, a controller that controls an on-duty cycle of a switching element in the chopper, a voltage detector that detects an output voltage, and a current detector that detects an output current. The controller controls the on-duty cycle of the switching element based on the output voltage and the output current to cause power less than or equal to a preset power to be supplied to an electric load.

4 Claims, 5 Drawing Sheets

POWER RECEIVER

CROSS-REFERENCE TO RELATED APPLICATION

This application claims priority to Japanese Patent Application No. 2022-097273 filed Jun. 16, 2022, the disclosure of which is hereby incorporated by reference in its entirety.

BACKGROUND OF THE INVENTION

Field of the Invention

The present invention relates to a power receiver installable in a movable body to receive power supply contactlessly through a feed line installed along a movement path for the movable body.

Description of Related Art

Japanese Patent No. 5447413 describes a contactless power feeder that feeds power contactlessly to a power receiver installed in a movable body (reference signs in parentheses in the background are the reference signs in the cited literature). The power receiver is installed in a movable body (17) (transport cart) to receive power supply contactlessly through a feed line (14) installed along the movement path for the movable body (17). In the contactless power feeder, a power supply (12) feeds a high-frequency current to the feed line (14), through which multiple movable bodies (17) receive power contactlessly. Each movable body (17) includes a power receiver including a pickup coil (51) and a power receiving unit (27). The power receiver supplies power to a load (e.g., an electric motor for traveling) installed in the movable body (17).

The power receiving unit (27) includes a chopper including a switching element (57) and a controller (61) that controls the chopper to maintain a constant output voltage (V2) output from the power receiving unit (27) to the load. The controller (61) controls the switching element (57) to increase the output voltage (V2) that is lower than a preset voltage and to decrease the output voltage (V2) that is higher than the preset voltage.

Such a contactless power feeder is included in, for example, an article transport facility in which multiple movable bodies (17) are in operation. At the startup of the contactless power feeder, the output voltage (V2) of the power receiving unit (27) in each movable body (17) is zero. The controller (61) in each movable body (17) controls the switching element (57) to increase the output voltage (V2). To avoid an overload of the power supply (12) as a power source of the feed line (14), the controller (61) controls the switching element (57) to regulate the rate of increase in the output voltage (V2) to be lower than in a normal operation.

The load being an electric motor can temporarily have a high electric load, causing the power receiver to output the output voltage (V2) lower than a reference voltage. In the normal operation of the power receiver, the controller (61) increases the output voltage (V2) at a normal rate of increase. When multiple movable bodies (17) temporarily have high electric loads at the same time, the power supply (12) may be overloaded in the same manner as at the startup. To avoid such temporary load increase, for example, a limited number of movable bodies (17) may operate at the same time. However, this limitation may lower the operating rate of the facility (e.g., the article transport facility) in which the movable bodies (17) are in operation.

SUMMARY OF THE INVENTION

In response to the above, a technique is awaited for appropriately supplying power through a feed line to multiple movable bodies each having a high electric load temporarily.

A power receiver according to one aspect is installable in a movable body to receive power supply contactlessly through a feed line installed along a movement path for the movable body. The power receiver includes a pickup coil that generates an induced electromotive force using an alternating current flowing through the feed line, a rectifier connected to the pickup coil, a chopper that regulates a voltage rectified by the rectifier and supplies the voltage to an electric load in the movable body, a controller that controls an on-duty cycle of a switching element included in the chopper, a voltage detector that detects an output voltage of the chopper, and a current detector that detects an output current of the chopper. The controller controls the on-duty cycle of the switching element based on the output voltage detected by the voltage detector and the output current detected by the current detector to cause power less than or equal to a preset power to be supplied to the electric load.

This structure controls the on-duty cycle of the switching element in the chopper to cause power less than or equal to a preset power to be supplied to the electric load in the movable body. This structure can avoid an overload of the power source that supplies power through the feed line to a preset number of movable bodies. In other words, this structure appropriately supplies power through the feed line to multiple movable bodies each having a high electric load temporarily.

Further aspects and features of the power receiver will be apparent from exemplary and nonlimiting embodiments described below with reference to the drawings.

DESCRIPTION OF THE INVENTION

Figure 1:
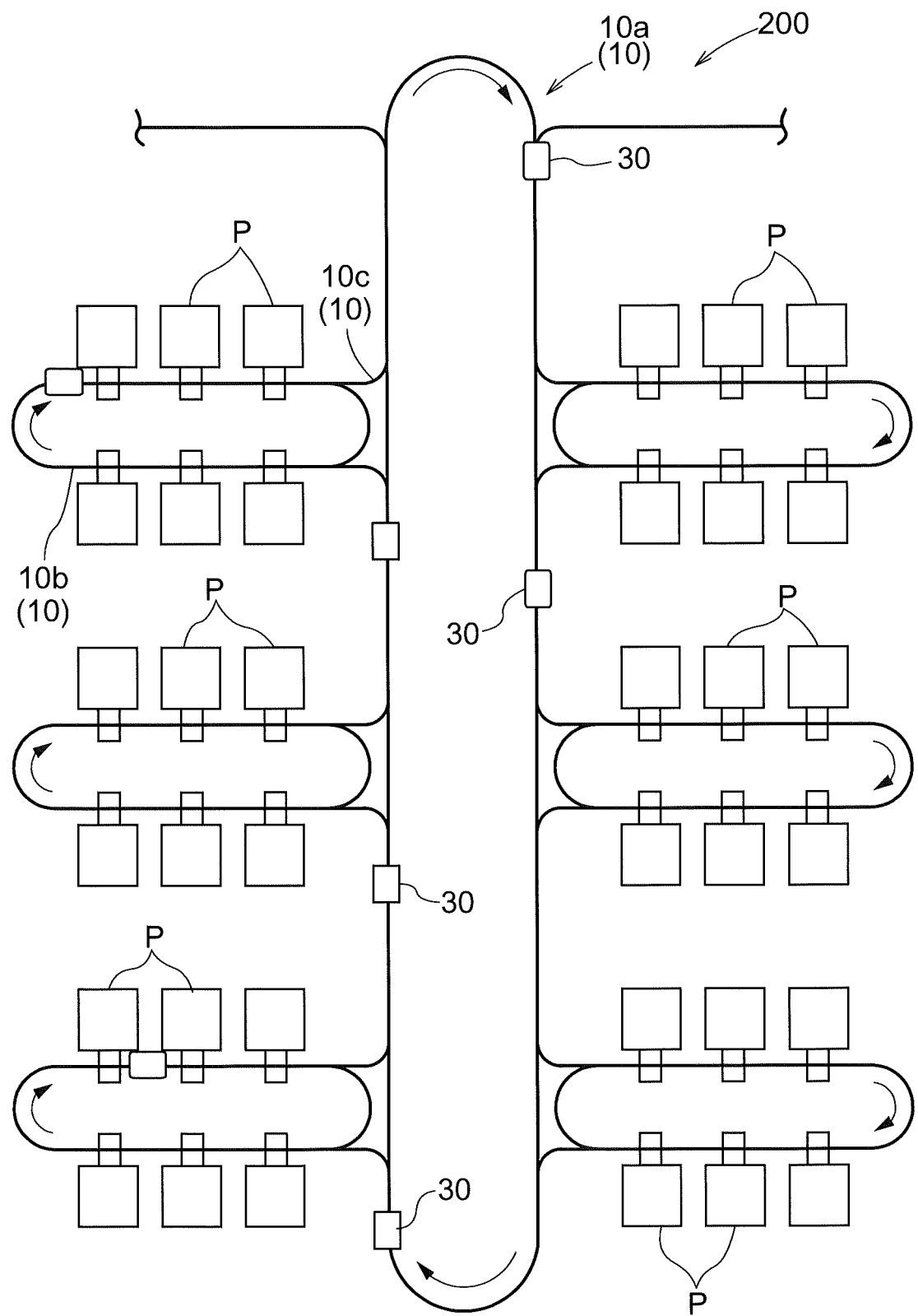
FIG. 1 is a plan view of an article transport facility including a contactless power feeder.
Figure 2:
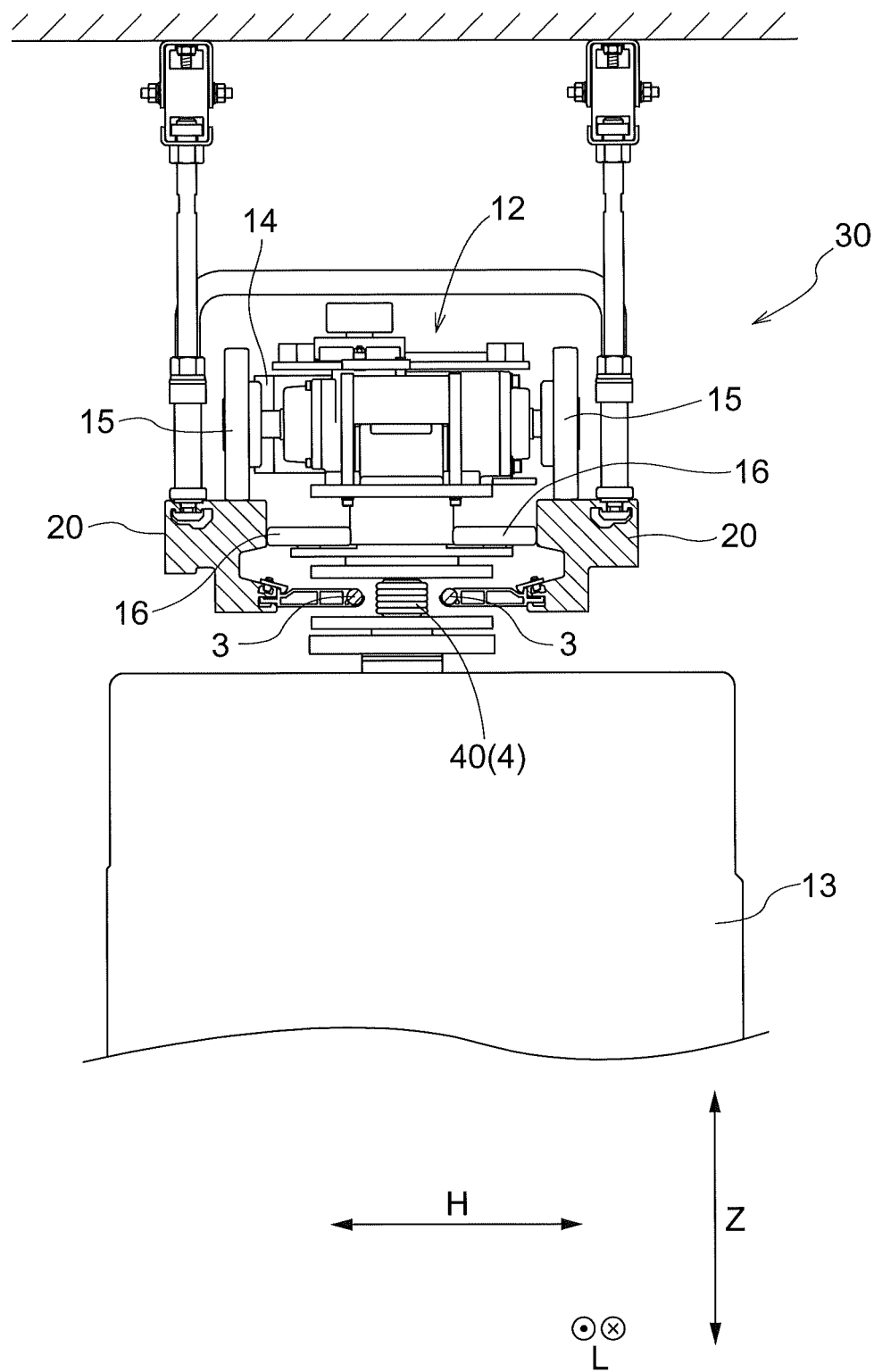
FIG. 2 is a front view of an article transport vehicle.

A power receiver according to one or more embodiments is installable in a movable body to receive power supply contactlessly through a feed line installed along a movement path for the movable body. The power receiver used in a contactless power feeder in an article transport facility will now be described with reference to the drawings. As shown in FIGS. 1 and 2, an article transport facility 200 in the present embodiment includes travel rails 20 installed along a movement path 10 as a travel path for article transport vehicles 30 (movable bodies), and the article transport vehicles 30 that travel along the movement path 10 as guided along the travel rails 20. In the present embodiment, the article transport vehicles 30 transport, for example, front opening unified pods (FOUPs) holding semiconductor substrates or glass substrates for displays. The article transport facility 200 also includes a storage (not shown) for semiconductor substrates, and article processors P in which circuitry and other components are formed on the semiconductor substrates. The movement path 10 includes, for example, a single looped primary path 10a, looped secondary paths 10b extending through multiple article processors P, and connecting paths connecting these primary and secondary paths 10a and 10b. In the present embodiment, the article transport vehicles 30 travel along the movement path 10 in a single direction as indicated by arrows.

As shown in FIG. 2, each article transport vehicle 30 in the present embodiment includes a traveler 12 to be guided by a pair of travel rails 20 hung from the ceiling along the movement path 10 to travel along the movement path 10, a body 13 located below the travel rails 20 and hung from the traveler 12, and a power receiver 4 for receiving driving power contactlessly through a feed line 3 installed along the movement path 10. Although not shown and not described in detail, the body 13 also includes an article support that is vertically movable and supports an article being hung.

As shown in FIG. 2, the traveler 12 includes a pair of travel wheels 15 that are drivable and rotatable by an electric drive motor 14. The travel wheels 15 roll on the upper surfaces of the travel rails 20 that serve as traveling surfaces. The traveler 12 also includes a pair of guide wheels 16 that are freely rotatable about an axis parallel to the vertical direction Z (about a vertical axis). The guide wheels 16 are in contact with the inner surfaces of the travel rails 20 of the pair. The traveler 12 also includes components such as the drive motor 14 for traveling and a drive circuit for the drive motor 14. The traveler 12 drives the article transport vehicle 30 to travel along the travel rails 20. The body 13 includes, for example, components such as an actuator that raises and lowers the article support and an actuator that drives a grip for an article, and drive circuits for these actuators. The drive motor 14, the actuators, and the driving circuits each correspond to an electric load LD (refer to FIG. 4) in each article transport vehicle 30 (movable body).

The power for components including the drive motor 14, the actuators, and the drive circuits is supplied contactlessly through the feed line 3 to the power receiver 4. As described above, the feed line 3, which supplies driving power to the transport vehicle 30 through the power receiver 4, extends along the movement path 10. In the present embodiment, the feed line 3 is on each side of the power receiver 4 in a path width direction H perpendicular to a path direction L (perpendicular to both the path direction L and the vertical direction Z in the embodiment) along the movement path 10.

Figure 3:
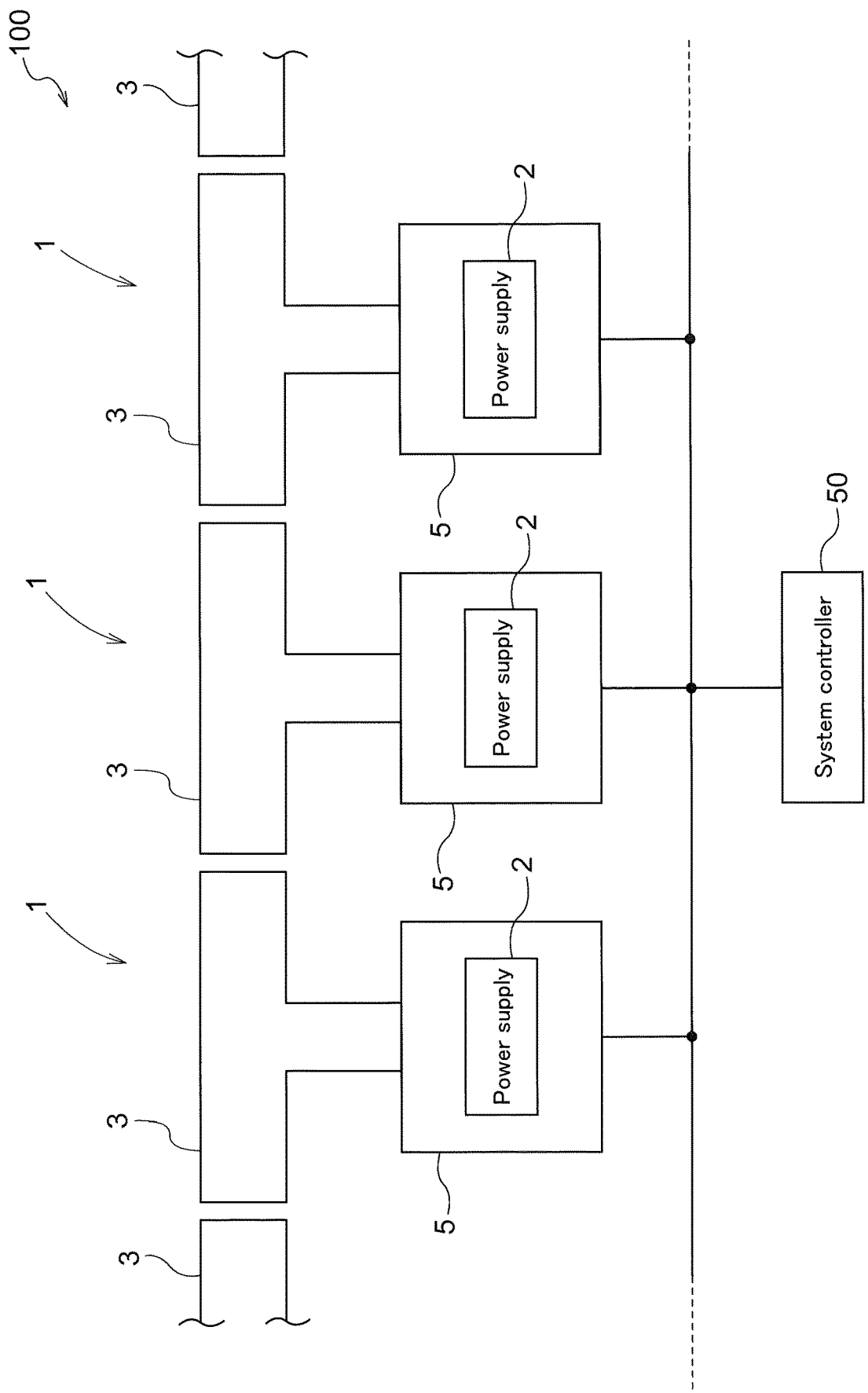
FIG. 3 is a schematic block diagram of the contactless power feeder, showing the system configuration.

A contactless power feeder 100 in the present embodiment supplies driving power to the electric loads LD in the article transport vehicles 30 using wireless power feeding, which is referred to as high efficiency inductive power distribution (HID). As shown in FIG. 3, the contactless power feeder 100 includes feed lines 3 and power supplies 2 connected to the feed lines 3 to supply an alternating current to the feed lines 3. The article transport facility 200 in the present embodiment is relatively large, as shown in FIG. 1. To avoid decreased efficiency in power transmission or stoppages of the entire facility upon failure, the contactless power feeder 100 includes, rather than one power feeding system 1, multiple power feeding systems 1 each including the feed line 3 and the power supply 2. One power feeding system 1 supplies power to multiple article transport vehicles 30.

Each article transport vehicle 30 switches between multiple power feeding systems 1 to continuously receive power supply and travel freely in the article transport facility 200. The article transport facility 200 includes a facility controller (not shown) that transmits a transport command to each article transport vehicle 30 to transport articles. Each article transport vehicle 30 travels autonomously based on the transport command to receive and deliver articles between, for example, an article processor P and another article transport vehicle 30 and to transport articles between an article processor P and the storage (not shown) described above. The facility controller selects article transport vehicles 30 appropriately for both a sender and a destination and transmits transport commands to the selected article transport vehicles 30 to allow each power feeding system 1 to supply power to a predetermined number of (N) article transport vehicles 30 or fewer.

Power feeders 5 each feed a high-frequency current to the corresponding feed line 3 as an induction line and generate a magnetic field around the feed line 3. Each feed line 3 includes a closed circuit that is electrically sufficiently long as a distributed constant circuit, in which inductance, capacitance, and resistance indicating the impedance of the feed line 3 are distributed. The impedance of each power feeding system 1 is also affected by mutual inductance generated by the feed line 3 coupled to a pickup coil 40 in the power receiver 4 included in the corresponding article transport vehicle 30. The contactless power feeder 100 thus regulates the impedance of each power feeding system 1 to substantially align the phases of the alternating currents supplied to the feed lines 3 in different power feeding systems 1. With the phases of the alternating currents through the multiple power feeding systems 1 being substantially aligned with one another, each article transport vehicle 30 can continuously receive power supply from the multiple power feeding systems 1 and travel autonomously in the article transport facility 200.

Each power feeding system 1 includes the power feeder 5 including such a regulation circuit. The power supply 2 is included in the power feeder 5. In other words, the contactless power feeder 100 includes the multiple power feeding systems 1 each including the power feeder including the power supply 2, and the feed line 3.

Figure 4:
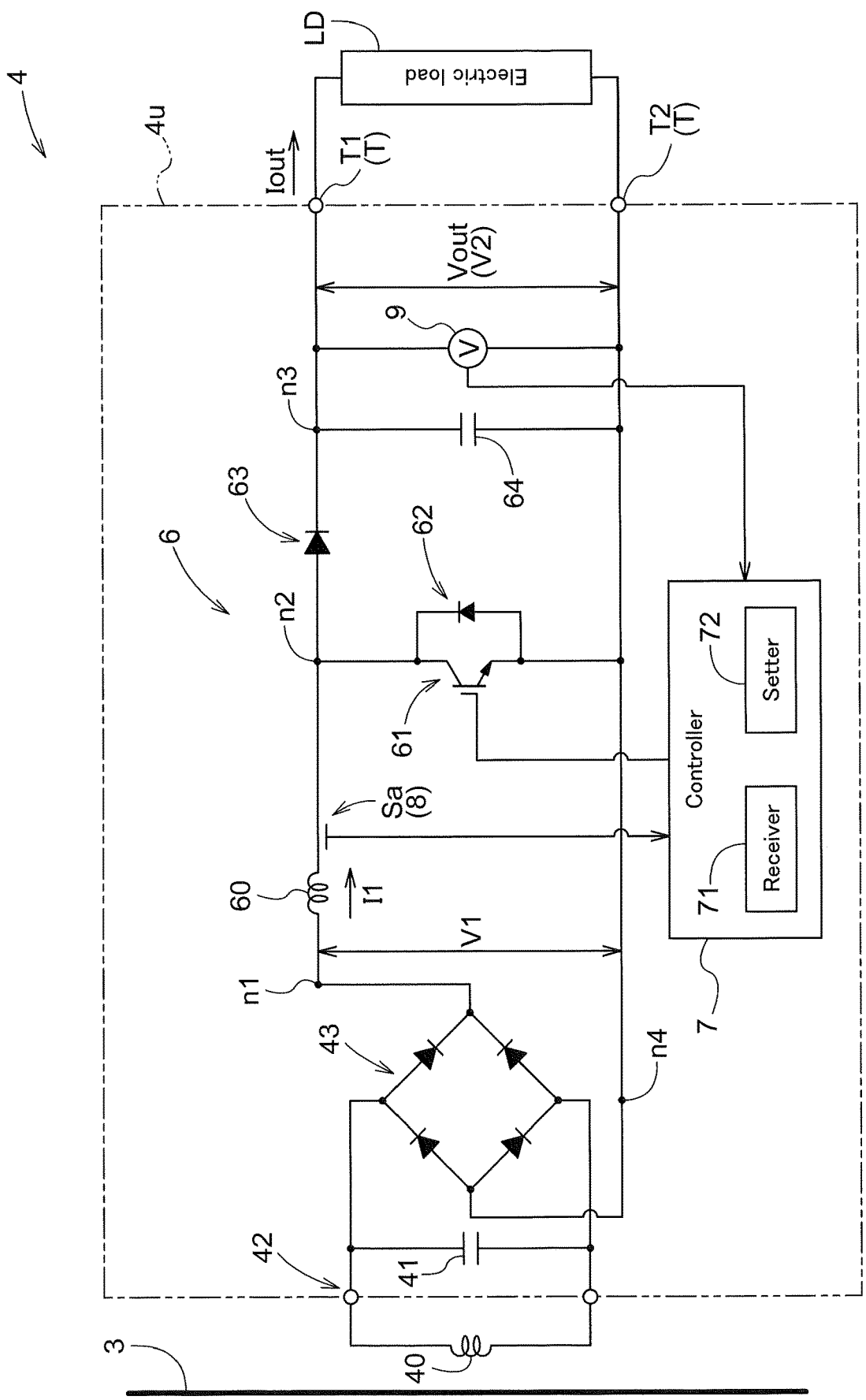
FIG. 4 is a circuit block diagram of an example power receiver.

The power receiver 4 includes the pickup coil 40 (refer to FIG. 2) located in each article transport vehicle 30 to face the feed line 3, and a power receiving unit 4u (refer to FIG. 4) on a wiring board in the article transport vehicle 30. As described above, the power feeder 5 feeds a high-frequency current to the feed line 3 as an induction line and generates a magnetic field around the feed line 3. The pickup coil 40 generates an induced electromotive force using the alternating current flowing through the feed line 3. As shown in FIG. 4, the power receiving unit 4u is electrically connected to the pickup coil 40. The electric load LD with variable power consumption is electrically connected to the power receiving unit 4u. The electric load LD is, for example, the drive motor 14 for traveling as described above, the actuator for raising and lowering the article supporter, the actuator for driving the grip for an article, or the driving circuits for the drive motor 14 and these actuators.

The power receiving unit 4u includes a part of a resonator 42 formed with the pickup coil 40, a rectifier 43, a chopper 6, a controller 7, a current detector 8, and a voltage detector 9. The resonator 42 is a parallel circuit including the pickup coil 40 and a resonant capacitor 41. The resonant capacitor 41 is included in the power receiving unit 4u. The rectifier 43 is connected in parallel to the resonator 42 (resonant capacitor 41). The rectifier 43 is connected to the pickup coil 40 (or connected to the resonator 42) to rectify the alternating current and an alternating current voltage induced by the pickup coil 40 to a direct current and a direct current voltage. In the present embodiment, the rectifier 43 is a full-wave rectifier circuit. The rectifier 43 may be a half-wave rectifier circuit, as easily understood by those skilled in the art and thus not shown or described in detail.

The chopper 6 is a regulator circuit that regulates a first voltage V1 as the direct current voltage rectified by the rectifier 43 to a second voltage V2. In the present embodiment, the chopper 6 includes a coil 60, a switching element 61, a freewheel diode 62 connected in anti-parallel to the switching element 61, and an output diode 63. A pulsating component contained in an output voltage from each of the rectifier 43 and the chopper 6 is smoothed by an output capacitor 64. The second voltage V2 as the output voltage of the chopper 6 serves as an output voltage Vout of the power receiver 4 and is supplied to the electric load LD in the article transport vehicle 30. The output capacitor 64 may be a part of the chopper 6 or may be connected in parallel to the chopper 6.

The voltage detector 9 detects the output voltage Vout (second voltage V2) of the chopper 6. The current detector 8 detects an output current Iout of the chopper 6 (serving also as an output current Iout of the power receiver 4). The current detector 8 may measure, rather than directly detecting the output current Iout, a current value at another location and detect the output current Iout by, for example, calculation based on the measurement value. In the present embodiment, as described later, the output current Iout is estimated based on a measured current (coil current I1) flowing through the coil 60 in the chopper 6. Although FIG. 4 shows the current detector 8 that detects the current contactlessly using, for example, a Hall integrated circuit (IC), the current detector 8 may detect the current contactlessly using a core or with contact using a shunt resistor.

The controller 7 controls the on-duty cycle of the switching element 61 included in the chopper 6 to control switching of the switching element 61. In the present embodiment, as described in detail later, the controller 7 controls an on-duty cycle Don of the switching element 61 (refer to, for example, Formula 5 below) based on the output voltage Vout detected by the voltage detector 9 and the output current Iout detected by the current detector 8 to cause power less than or equal to a preset power Wt (refer to, for example, Formula 1 below) to be supplied to the electric load LD.

Figure 5:
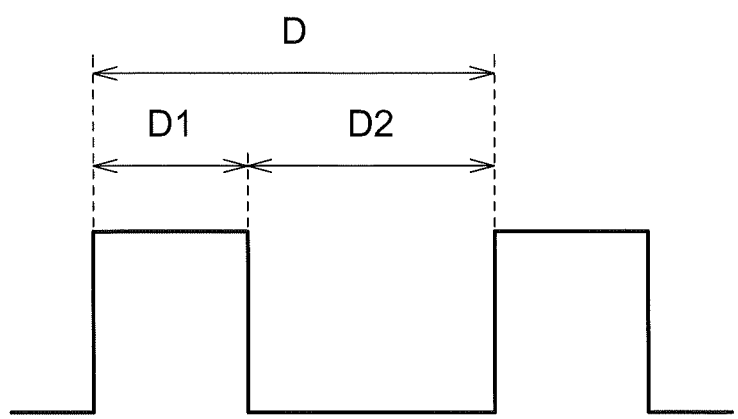
FIG. 5 is a schematic waveform diagram of a switching pulse for controlling a chopper.

As shown in FIG. 5, the on-duty cycle Don indicates the period for which the switching element 61 is controlled to be in an on-state in one cycle D of a switching control signal for controlling switching of the switching element 61. In the present embodiment, as shown in FIG. 4, the switching element 61 is an insulated-gate bipolar transistor (IGBT). With the switching control signal being at a high level, the switching element 61 is controlled to be in an on-state. With the switching control signal being at a low level, the switching element 61 is controlled to be in an off-state. The on-duty cycle Don thus corresponds to a value D1/D obtained by dividing the period for which the switching control signal is at a high level (a first period D1) by one cycle D (=D1+D2). An off-duty cycle Doff corresponds to a value D2/D obtained by dividing a period for which the switching control signal is at a low level (a second period D2) by one cycle D.

As described above, the direct current voltage output from the rectifier 43 is the first voltage V1. As shown in FIG. 4, a first node n1, a second node n2, and a third node n3 may be imaginarily defined on the positive electrode end for the direct current voltage, and a fourth node n4 on the negative electrode end. The first node n1 is near the output of the rectifier 43 on the positive electrode end. The fourth node n4 is near the output of the rectifier 43 on the negative electrode end. The second node n2 is inside the chopper 6. The third node n3 is defined as a node at the same potential as a first output terminal T1 that is one output terminal in a power-receiving output terminal pair T connected to the electric load LD. A second output terminal T2 being the other output terminal in the power-receiving output terminal pair T is connected to the fourth node n4. In other words, the fourth node n4 and the second output terminal T2 are at the same potential.

The coil 60 included in the chopper 6 is connected in series between the first node n1 (rectifier 43) and the second node n2. In other words, one end of the coil 60 is connected to the rectifier 43. The output diode 63 is connected in series between the second node n2 and the third node n3 with the direction from the second node n2 to the third node n3 being a forward direction. In other words, the output diode 63 is connected in the forward direction between the coil 60 and the first output terminal T1. The switching element 61 including the freewheel diode 62 is connected between the second node n2 and the fourth node n4. In other words, the switching element 61 is located between the anode terminal of the output diode 63 and the second output terminal T2.

When the switching element 61 is in an off-state, the output capacitor 64 is charged by the rectifier 43 through the chopper 6 (through the coil 60 and the output diode 63), increasing the output voltage Vout. When the switching element 61 is in an on-state, the output capacitor 64 is uncharged. The output voltage Vout thus decreases in response to consumption of charge at the electric load LD. When the output voltage Vout decreases below a predetermined target voltage, the controller 7 lowers the on-duty cycle to increase the output voltage Vout. When the output voltage Vout increases to or above the target voltage, the controller 7 increases the on-duty cycle Don to decrease the output voltage Vout. In this manner, the controller 7 controls the chopper 6 to regulate the output voltage Vout at the predetermined target voltage.

As described above, the contactless power feeder 100 in the present embodiment is included in the article transport facility 200 in which multiple article transport vehicles 30 are in operation. At the startup of the contactless power feeder 100, the output voltage Vout of the power receiver 4 in each article transport vehicle 30 is zero. Thus, the controller 7 in the power receiver 4 in each article transport vehicle 30 controls the switching element 61 to increase the output voltage Vout. The controller 7 controls the switching element 61 with, for example, an on-duty cycle Don close to 0%. When the power receiver 4 in each article transport vehicle 30 has the chopper 6 controlled with such a low on-duty cycle Don, the power supplies 2 as the power sources of the feed lines 3 may be overloaded. In the present embodiment, as described above, the controller 7 controls the on-duty cycle Don of the switching element 61 to cause power less than or equal to the preset power Wt to be supplied to the electric load LD. As described in detail later, this control is effective also at the startup of the contactless power feeder 100, independently of whether the electric load LD is consuming power. Thus, the power supplies 2 as the power sources of the feed lines 3 are less likely to be overloaded.

As described above, one power feeding system 1 supplies power to multiple article transport vehicles 30. Each article transport vehicle 30 under autonomous control transports articles in response to a transport command from the facility controller (not shown). In this state, each article transport vehicle 30 drives, for example, the drive motor 14 in the traveler 12 and the actuators for the article supporter and the grip. When, for example, the drive motor 14 starts driving, a current greater than in the normal operation flows, causing the electric load LD to consume greater power. The electric load LD in each article transport vehicle 30 may consume power greater than in the normal operation due to various other factors such as the operational state of the corresponding article transport vehicle 30 and the state of the movement path. In these cases, the controller 7 in the power receiver 4 in each article transport vehicle 30 controls the chopper 6 to decrease the on-duty cycle Don. In this state, power greater than in the normal operation is to be supplied to the power receiver 4 through the feed line 3. This increases the load on the power supply 2 supplying the power to the feed line 3, causing the power supply 2 to be overloaded.

In the present embodiment, the controller 7 controls the on-duty cycle Don of the switching element 61 to cause power less than or equal to the preset power Wt to be supplied to the electric load LD, independently of the output voltage Vout relative to the target voltage. In other words, with the output voltage Vout decreasing below the target voltage, the controller 7 controls the on-duty cycle Don of the switching element 61 to prevent the power supply from being greater than the preset power Wt. This restricts the rate of increase in the output voltage Vout decreasing below the target voltage, thus increasing the time until the output voltage Vout returns to the target voltage. However, such temporary increase in power consumption in response to the startup of, for example, the drive motor 14 does not greatly degrade the driving of the drive motor 14 due to decrease in the output voltage Vout, causing substantially no practical issue.

The preset power Wt is a value obtained by, for example, dividing an upper-limit feeding power Wmax by the number of power receiving vehicles N, where the upper-limit feeding power Wmax is an upper limit value of power supplied to the feed line 3 from the power supply 2 (power feeder 5), and the number of power receiving vehicles N is the number of article transport vehicles 30 receiving power from the same power feeding system 1 through the feed line 3. More specifically, as expressed by Formula 1 below, the preset power Wt may be less than or equal to the value obtained by dividing the upper-limit feeding power Wmax by the number of power receiving vehicles N.

$$Wt \leq Wmax/N \quad (1)$$

With the preset power Wt obtained as described above, the total amount of power (=Wt·N) supplied to the N article transport vehicles 30 through the feed line 3 does not exceed the upper-limit feeding power Wmax, independently of the amount of power to be used by all the article transport vehicles 30 reaching the preset power Wt. In other words, the power supply 2 for supplying power to the feed line 3 can avoid an overload.

The preset power Wt may be set in any manner other than based on the correspondence between the upper-limit feeding power Wmax and the number of power receiving vehicles N. In the present embodiment, the controller 7 includes a receiver 71 that receives a setting value for the preset power Wt and a setter 72 that sets the setting value received by the receiver 71. The receiver 71 and the setter 72 are used to set the setting value for the preset power Wt with each article transport vehicle 30. The setting value set with each article transport vehicle 30 may be changed. This allows article transport vehicles 30 of multiple types including electric loads LD each with different power consumption to use power receivers 4 with a common hardware structure. Such multiple article transport vehicles 30 may be used as power feeding targets to receive power from one power feeding system 1. Thus, the article transport facility 200 can be operated more flexibly.

The facility controller may lower the preset power Wt as appropriately for, for example, the operational states of the article transport vehicles 30 to temporarily increase the number of article transport vehicles 30 (the number of power receiving vehicles N) receiving power supply through the same feed line 3. The preset power Wt may be increased to temporarily decrease the number of article transport vehicles 30. With the preset power Wt being variable, the article transport facility 200 can be operated more flexibly.

In the present embodiment, the controller 7 mainly includes a processor, such as a microcomputer. The receiver 71 may be, for example, a communicator (not shown). In this case, the setting value for the preset power Wt may be transmitted as a command from, for example, the facility controller (not shown) in the article transport facility 200 or a system controller 50 in the contactless power feeder 100. The receiver 71 may also be a port of the microcomputer. The port is connected to, for example, a switch (not shown) on the wiring board in the power receiving unit 4u. The switch is used to specify the set value. The setting value specified with the switch is read by the processor through the port. The setter 72 may be, for example, a register in the processor. The setting value received by the receiver 71 may be stored in the register. The setting value stored in the register may be rewritten to easily change the setting value for the preset power Wt.

The setting value may be set through both the port and the communicator. For example, the power receivers 4 with the common hardware structure may include the switches to be used to specify the set values. In each article transport vehicle 30, the setting value specified with the switch may be set at the startup as an initial value for the preset power Wt. The setting value for the preset power Wt as the initial value may be changed through the communicator.

In the present embodiment, the controller 7 calculates the power supplied to the electric load LD based on the output voltage Vout detected by the voltage detector 9 and the output current Iout detected by the current detector 8. In the present embodiment, as shown in FIG. 4, the power receiver 4 includes a current sensor Sa between the coil 60 and the second node n2 included in the chopper 6 to detect the current through the coil 60. The current sensor Sa in FIG. 4 is a contactless sensor as a magnetic sensor for detecting the magnetic field generated by eddy currents. However, instead of any specific sensors, for example, a shunt resistor may be used to convert the current value to a voltage to detect the current. The controller 7 estimates the output current Iout based on the coil current I1 flowing through the coil 60 and calculates the on-duty cycle Don. The preset power Wt is expressed by Formula 2 below.

$$Wt = Vout \cdot Iout \quad (2)$$

The output current Iout may be expressed by Formula 3 below, based on the coil current I1 flowing through the coil 60 and the on-duty cycle of the switching element 61 (Don=D1/(D1+D2)).

$$Iout = I1 \cdot (1 - Don) \quad (3)$$

Using Formula 2, the output current Iout is expressed by Formula 4 below.

$$Iout = Wt/Vout \quad (4)$$

Using Formulas 3 and 4, the on-duty cycle Don is obtained with Formula 5 below.

$$Don = 1 - (Iout/I1) \quad (5)$$
$$= 1 - (Wt/(Vout \cdot I1))$$

As described above, the controller 7 mainly includes a processor, such as a microcomputer. The controller 7 can thus repeatedly obtain the coil current I1 and perform calculation using Formulas 3 to 5 in each of predetermined control cycles. For example, the on-duty cycle Don used in Formula 3 is an on-duty cycle Don calculated in the previous control cycle and currently used. The on-duty cycle Don obtained in Formula 5 is an on-duty cycle Don calculated in the current control cycle and to be used in the next control cycle.

The controller 7 may constantly control switching of the switching element 61 using the on-duty cycle Don, but may control the switching element 61 using the on-duty cycle Don obtained with Formula 5 as a lower limit. For example, the on-duty cycle Don is normally decreased to increase the output voltage Vout when the output voltage Vout is lower than a preset voltage, and is increased to lower the output voltage Vout when the output voltage Vout is higher than the preset voltage. In this state, the on-duty cycle Don obtained in Formula 5 may be set as the lower limit of the on-duty cycle Don. With the limit set as above, the power supplied to the electric load LD is regulated to less than the preset power Wt.

Although the coil current I1 is detected in the above example, the output current Iout may be directly detected with a current sensor located between the third node n3 and the first output terminal T1. The output current Iout may be estimated based on a detected current flowing through the resonator 42 (current flowing through the resonant capacitor 41 in the power receiving unit 4u). In such cases, a shunt resistor may also be used to detect the current.

In the above structure in which the coil current I1 is detected to estimate the output current Iout, the rate of increase in the output voltage Vout is also restricted at, for example, the startup of the contactless power feeder 100, at which the coil current I1 flows and charges the output capacitor 64 without power being supplied to the electric load LD. In other words, in the present embodiment, the controller 7 controls the on-duty cycle Don of the switching element 61 to cause power less than or equal to the preset power Wt to be supplied to the electric load LD. This control is also effective at the startup of the contactless power feeder 100, independently of whether the electric load LD is consuming power. This allows the same control to be performed at any temporary increase in the power consumption in the normal operation and at the startup of the contactless power feeder 100, thus reducing the complexity of the system.

Other embodiments will now be described. The structures described in the embodiments below may not be implemented separately but may be combined with those in other embodiments unless any contradiction arises.

(1) In the above embodiments, the movable body is an article transport vehicle 30 as a ceiling-hung transport vehicle that includes the travel rails 20 hung from the ceiling. However, the movable body may be a ground-based article transport vehicle that travels along the movement path 10 on the floor when including a similar contactless power feeder 100.

(2) In the above embodiments, the preset power Wt is the value obtained by dividing the upper-limit feeding power Wmax by the number of power receiving vehicles N. However, the preset power Wt may be set independently of the correspondence between the upper-limit feeding power Wmax and the number of power receiving vehicles N. For example, the preset power Wt may be a value for preventing a current exceeding rated values of circuit components in the power receiver 4 from flowing to cause an overload of the power receiver 4. With the preset power Wt, the system can be designed without setting increased rated values for the power receiver 4 to accommodate greater power supplied to the electric load LD. The cost of the power receiver 4 can thus be reduced easily.

(3) In the above embodiments, the controller 7 includes the receiver 71 and the setter 72 to change the preset power Wt. However, the controller 7 may eliminate the receiver 71 or the setter 72, with the preset power Wt being a fixed value.

The power receiver described above will be briefly summarized below.

A power receiver according to one embodiment is installable in a movable body to receive power supply contactlessly through a feed line installed along a movement path for the movable body. The power receiver includes a pickup coil that generates an induced electromotive force using an alternating current flowing through the feed line, a rectifier connected to the pickup coil, a chopper that regulates a voltage rectified by the rectifier and supplies the voltage to an electric load in the movable body, a controller that controls an on-duty cycle of a switching element included in the chopper, a voltage detector that detects an output voltage of the chopper, and a current detector that detects an output current of the chopper. The controller controls the on-duty cycle of the switching element based on the output voltage detected by the voltage detector and the output current detected by the current detector to cause power less than or equal to a preset power to be supplied to the electric load.

This structure controls the on-duty cycle of the switching element in the chopper to cause power less than or equal to a preset power to be supplied to the electric load in the movable body. This structure can avoid an overload of the power source that supplies power through the feed line to a preset number of movable bodies. In other words, this structure appropriately supplies power through the feed line to multiple movable bodies each having a high electric load temporarily.

The preset power may be a value obtained by dividing an upper-limit feeding power by a number of power receiving bodies, where the upper-limit feeding power is an upper limit value of power supplied to the feed line, and the number of power receiving bodies is a number of movable bodies receiving power through the feed line.

With the preset power being set as described above, the total amount of power supplied to the power-receiving bodies through the feed line does not exceed the upper-limit feeding power, independently of the amount of power to be used by all the movable bodies reaches the maximum. In other words, the power supply for supplying power to the feed line can avoid an overload. Thus, the structure appropriately supplies power through the feed line to multiple movable bodies each having a high electric load temporarily.

The controller may include a receiver that receives a setting value for the preset power, and a setter that sets the setting value received by the receiver.

This structure allows each movable body to have a set value. This allows movable bodies of multiple types including electric loads each with different power consumption to use power receivers with a common hardware structure. The structure can lower the preset power as appropriately for, for example, the operational states of the movable bodies to temporarily increase the number of movable bodies receiving power supply through the same feed line.

The power receiver may further include a power-receiving output terminal pair being a pair of output terminals connectable to the electric load. The chopper may further include a coil connected to the rectifier, and a diode connected in a forward direction between the coil and a first output terminal being one output terminal in the power-receiving output terminal pair. The switching element may be between an anode terminal of the diode and a second output terminal being the other output terminal in the power-receiving output terminal pair. The current detector may include a current sensor that detects a current flowing through the coil, and estimate the output current output to the power-receiving output terminal pair based on a value of the current detected by the current sensor and the on-duty cycle of the switching element.

The current flowing through the coil is detected to allow detection of the state of the current flowing through the pickup coil promptly and accurately. This allows prompt and accurate regulation of power supply with the preset power as the upper limit. This structure includes no additional current sensor to detect the output current other than the current sensor to detect the current flowing through the coil, and thus includes fewer current sensors in the power receiver.

What is claimed is:

1. A power receiver installable in a movable body to receive power supply contactlessly through a feed line installed along a movement path for the movable body, the power receiver comprising:
    a pickup coil configured to generate an induced electromotive force using an alternating current flowing through the feed line;
    a rectifier connected to the pickup coil;
    a chopper configured to regulate a voltage rectified by the rectifier and supply the voltage to an electric load in the movable body;
    a controller configured to control an on-duty cycle of a switching element included in the chopper;
    a voltage detector configured to detect an output voltage of the chopper; and
    a current detector configured to detect an output current of the chopper,
    wherein the controller controls the on-duty cycle of the switching element based on the output voltage detected by the voltage detector and the output current detected by the current detector to cause power less than or equal to a preset power to be supplied to the electric load.

2. The power receiver according to claim 1, wherein;
    the preset power is a value obtained by dividing an upper-limit feeding power by a number of power receiving bodies, where the upper-limit feeding power is an upper limit value of power supplied to the feed line, and the number of power receiving bodies is a number of movable bodies receiving power through the feed line.

3. The power receiver according to claim 1, wherein;
    the controller comprises a receiver configured to receive a setting value for the preset power, and a setter configured to set the setting value received by the receiver.

4. The power receiver according to claim 1, further comprising:
    a power-receiving output terminal pair being that is a pair of output terminals connectable to the electric load, and
    wherein:
        the chopper further comprises a coil connected to the rectifier, and a diode connected in a forward direction between the coil and a first output terminal that is one output terminal in the power-receiving output terminal pair,
        the switching element is between an anode terminal of the diode and a second output terminal that is the other output terminal in the power-receiving output terminal pair, and
        the current detector comprises a current sensor configured to detect a current flowing through the coil, and estimates the output current output to the power-receiving output terminal pair based on a value of the current detected by the current sensor and the on-duty cycle of the switching element.

* * * * *

UNITED STATES PATENT AND TRADEMARK OFFICE
CERTIFICATE OF CORRECTION

PATENT NO. : 12,113,367 B2
APPLICATION NO. : 18/210288
DATED : October 8, 2024
INVENTOR(S) : Jun Tanaka Page 1 of 1

It is certified that error appears in the above-identified patent and that said Letters Patent is hereby corrected as shown below:

In the Claims

Column 12, Line 28, Claim 4, before "that" delete "being"

Signed and Sealed this
Thirty-first Day of December, 2024

Derrick Brent
*Acting Director of the United States Patent and Trademark Office*